(No Model.)  L. T. WEISS.  3 Sheets—Sheet 1.
CASH REGISTER AND INDICATOR.
No. 440,382. Patented Nov. 11, 1890.
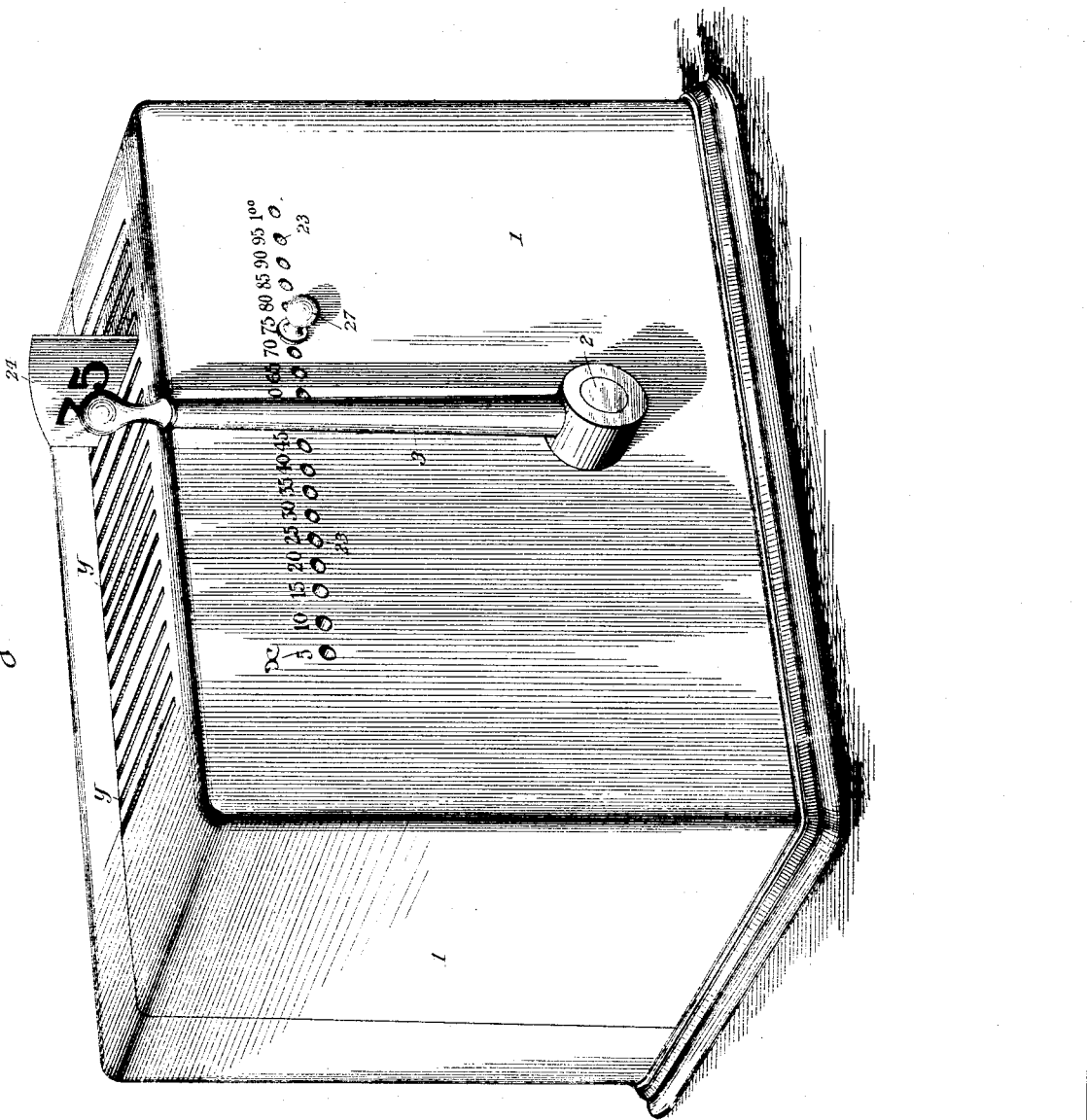

(No Model.) 3 Sheets—Sheet 2.
L. T. WEISS.
CASH REGISTER AND INDICATOR.
No. 440,382. Patented Nov. 11, 1890.
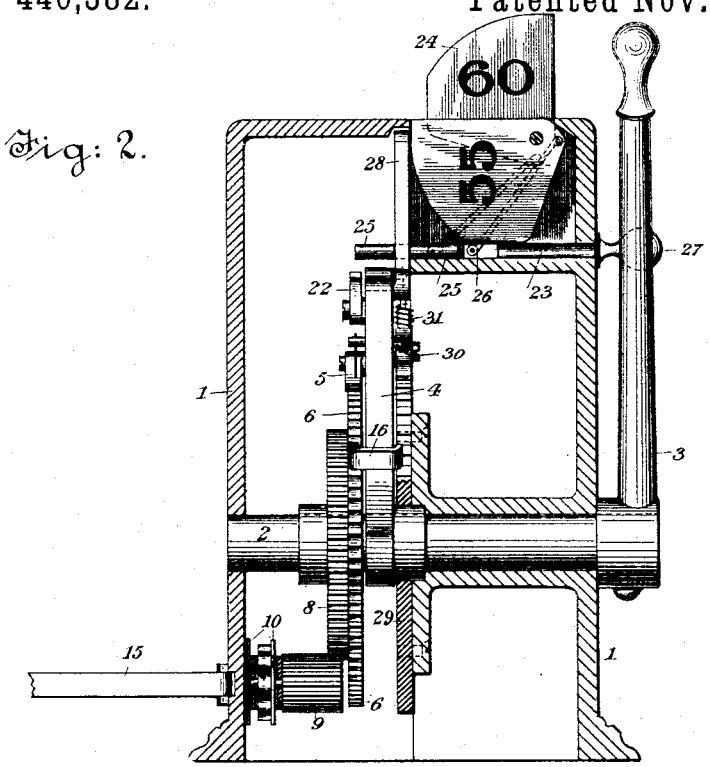
Fig: 2.
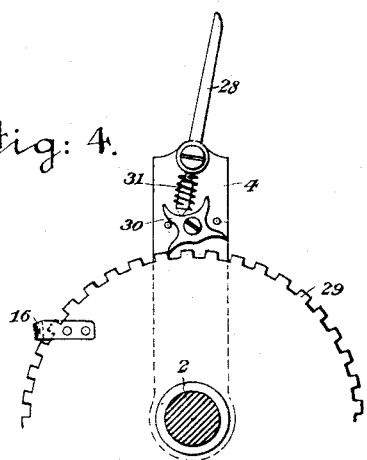
Fig: 4.
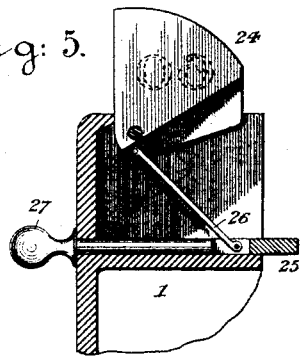
Fig: 5.
WITNESSES:
INVENTOR:
By Henry Connett
Attorney.

(No Model.) 3 Sheets—Sheet 3.
L. T. WEISS.
CASH REGISTER AND INDICATOR.
No. 440,382. Patented Nov. 11, 1890.
Fig. 3.
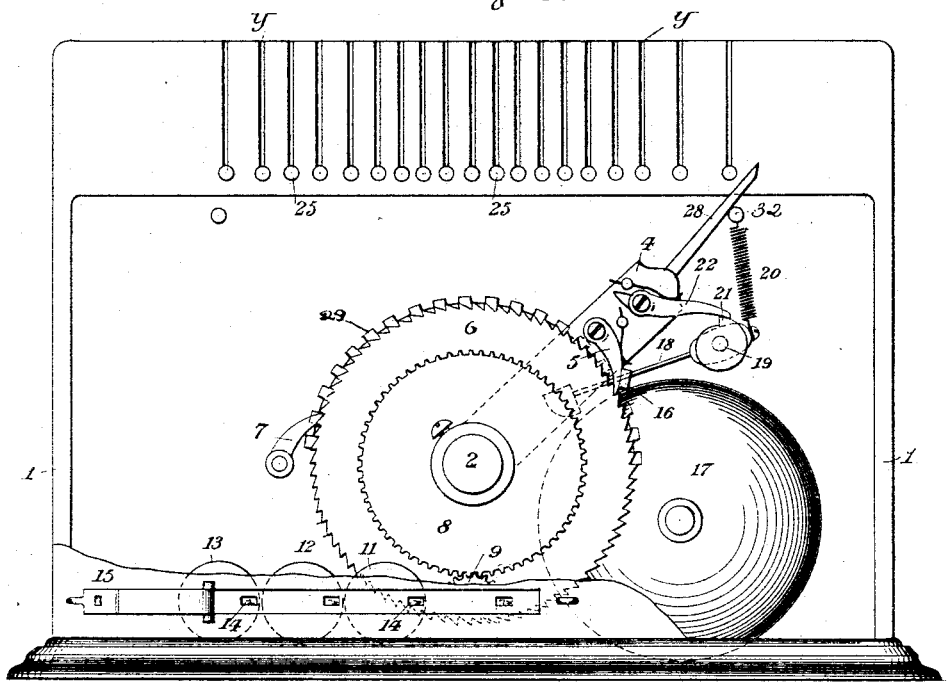
Fig. 3ª.
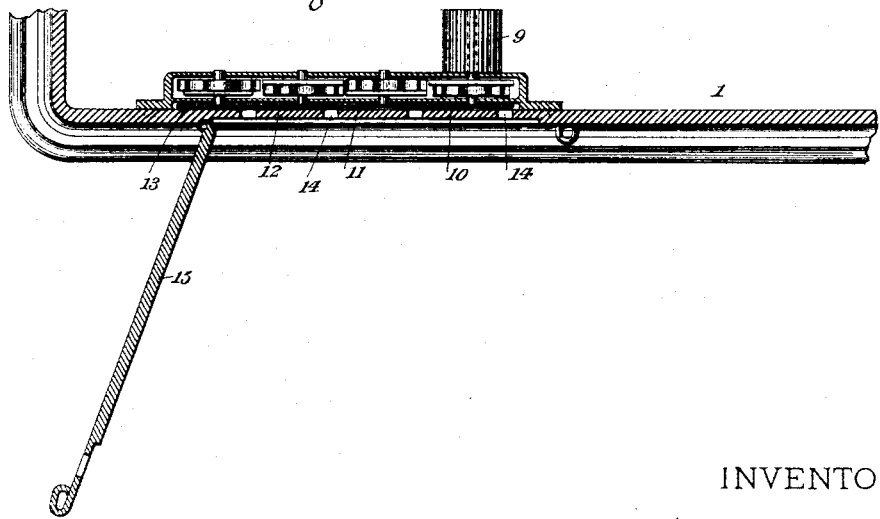
WITNESSES:
INVENTOR:
Louis T. Weiss,
By Henry Connell
Attorney.
THE NORRIS PETERS CO., PHOTO-LITHO., WASHINGTON, D. C.

UNITED STATES PATENT OFFICE.

LOUIS T. WEISS, OF BROOKLYN, ASSIGNOR TO THOMAS MURTHA AND FRANK BURNS, OF NEW YORK, N. Y.

CASH REGISTER AND INDICATOR.

SPECIFICATION forming part of Letters Patent No. 440,382, dated November 11, 1890.

Application filed February 3, 1890. Serial No. 339,052. (No model.)

*To all whom it may concern:*

Be it known that I, LOUIS T. WEISS, a citizen of the United States, residing in Brooklyn, Kings county, New York, have invented certain Improvements in Cash-Counters, of which the following is a specification.

My invention relates to that class of cash-counters of which the counter illustrated in my pending application, Serial No. 332,046, is an example, and in my present apparatus I employ some of the same devices or instrumentalities that are illustrated in my said application. I do not claim these instrumentalities herein, however, but will fully describe them, and point out the novel features of this apparatus in the claims.

This counter is intended for use in stores, bar-rooms, and the like to serve as a check on the salesman or bartender, who must "ring up" on the counter every sale effected.

The counter produces three results at each operation—namely, it rings a bell or gong, throws up a plate with a numeral marked on it corresponding to the amount paid by the customer, and adds the amount paid to the sum already received.

In the accompanying drawings, which serve to illustrate my invention, Figure 1 is a perspective view of the apparatus, showing the front side and top thereof. Fig. 2 is a vertical transverse section in the plane of the main rock-shaft. Fig. 3 is a rear sectional elevation, the bottom portion being in rear elevation. Fig. 3ª is a fragmentary sectional plan of the adding mechanism. Fig. 4 is a detail view of the shifting-dog. Fig. 5 is a detail view illustrating the construction and operation of the numeral bearing or indicating plates.

Before proceeding with the detailed description of my apparatus I will say that it is adapted for adding up fives or multiples of five. The sums ordinarily received by the bartender are of this character, as five, ten, fifteen, &c., and a machine may be constructed to add up these numbers more simply and cheaply than one adapted to add all the numbers, as one, two, three, four, &c. However, some of the instrumentalities of my apparatus are as well adapted to apparatuses which add up all the numbers. The customer sees before him the exact amount of his purchase, and he hears the sound of the gong at each operation, as the bartender must actuate the gong or bell mechanism at each operation.

1 is the casing of somewhat rectangular form, which I prefer to make of cast-iron in two parts, adapted to be secured together by screws. This casing has a flat top, the surface of which is parallel with the base. In this casing is mounted a rock-shaft 2, which is provided with an operating arm or crank 3 on its projecting end at the front of the casing. Fixed on the shaft 2 inside of the casing is an arm 4, bearing a spring-pawl 5, which engages the teeth of a ratchet-wheel 6, which turns loosely on the shaft 2. Back rotation of this ratchet-wheel is prevented by a stop-pawl 7, and the said wheel is adapted to be rotated intermittently by the pawl 5. The arm 4 is adapted to move effectively only through a quarter-rotation, or forty-five degrees, and the ratchet-wheel 6 has only eighty teeth. Consequently each full backward movement of said arm imparts a quarter-rotation to the ratchet-wheel, the pawl 5 passing over twenty teeth of the ratchet in each full forward movement of the arm. Secured to the ratchet-wheel is a spur-wheel 8, which gears with and drives a pinion 9 below it. This pinion has one-fourth as many teeth as the spur-wheel, and consequently turns once around when the spur-wheel and ratchet-wheel turn a quarter-way round. Carried by the shaft of pinion 9 is a disk 10, which by reason of the proportions of the mechanism, as above stated, is turned once on its axis at each full backward movement of the arm 4. The disk 10, I call a "cents-disk," and its face bears a series of twenty equally-spaced numerals "5," "10," "15," &c., up to "95." There are three other disks 11, 12, and 13, each of which has a series of numerals from "1" to "0" marked on its face. 11 is the "dollar-disk," 12 is the "ten-dollar disk," and 13 is the "hundred-dollar disk." At each time the disk 10 moves on its axis it imparts one-tenth of a rotation to the disk 11. The disk 11 drives the disk 12 intermittently in the same manner, and the disk 12 drives the disk 13 also in the same manner. Any of the well-known mechanisms employed in this class of adding or counting machines for causing one disk to drive another intermittently may be employed. That herein illustrated is well known and will require no description.

The numerals on the faces of the disks appear at the several sight-holes 14 in the casing, and these will be covered by a hinged wicket 15, which may be locked by the proprietor.

As a sudden movement of the operating-arm 3, acting through the inner arm 4 and pawl 5, may cause the momentum of the ratchet-wheel 6 to drive the latter one or more teeth too far, I provide a fixed pawl-stop 16, which projects out over the wheel at the proper point for the pawl to pass under it at the terminus of its operative stroke or movement. This stop stands so close to the pawl at this moment that the latter cannot rise and permit a tooth of the ratchet-wheel to pass, and consequently the latter wheel cannot move any farther than the pawl is intended to drive it, but is locked by the pawl itself at the end of its proper movement.

At the end of the backward movement of the operating-arm 3 a gong 17 is sounded. This gong is mounted, in the usual manner of gongs, on the inside of the casing and is struck by a hammer 18, fixed to a rock-shaft 19. The hammer is actuated by a spring 20, and is drawn back and set free by a trip device, which I will now describe. On the shaft 19 is secured a disk or piece having a shoulder 21, and pivoted to the arm 4 is a sort of spring-pawl 22, which, when the arm 4 is moved backward to the limit of its operative movement, strikes or engages the shoulder 21 and rotates the hammer-shaft 19 to a limited extent. This draws back the bell-hammer. The pawl 22 now slips off the shoulder 21 and frees the hammer, when the spring 20 causes it to strike the gong a smart blow.

The above-described mechanism enables the operator by vibrating the arm 3 to the proper extent to add up any sum of five or a multiple thereof, and in order that he may be able to gage the extent of said movement, and at the same time to throw up a numeral-bearing plate, I employ the devices I will now describe.

In the face of the casing 1 is a series of holes 23, arranged in a straight line parallel with the top of the casing. These holes are on imaginary radii drawn from the axis of shaft 2 as a center, the angle included between adjacent radii being equal to four and five-tenths degrees, or one-eightieth of the entire circle. Above these holes are marked a series $x$ of indicating-numerals "5," "10," "15," "95," "100."

In the crown or flat top of the casing is a series of vertical slits $y$, one for each of the holes 23 and extending down into the same. These holes 23 and slits $y$ are formed in a thickened portion of the casing, and the holes extend through this portion and open into the interior of the casing. In each slit is pivotally mounted a numeral-bearing plate 24, adapted to be turned up so as to be visible, as seen in Fig. 5, and each of these plates bears in large figures the numeral below it in the series $x$. In each of the holes 23 is mounted a sliding piece or piston 25, which is coupled to the corresponding plate 24 by a link 26. When a pin of any kind—as pin 27, for example—is inserted in one of the holes 23 from the outside of the casing, it strikes the piston 25 and pushes it through until it protrudes from the inner end of the hole, and this displacement of the piston, acting through the link 26, turns the plate 24 on its pivot and throws it up, as seen in Fig. 5. When pin 27 is withdrawn, the plate falls back into the slot by its own weight and retracts the piston 25 to its first position. The piston 25, when protruded by pin 27, stands in the path of a rocker arm or shifter 28, pivotally mounted on the arm 4. This shifter is best seen in Fig. 4.

On the casing inside is fixed a circular rack 29, which has teeth corresponding to the teeth in the ratchet-wheel 6, and pivotally mounted on the arm 4, so as to engage the teeth of the rack 29, is a double-pawl device 30, which I call a "shifting dog." Either end of this dog may be made to engage the teeth of rack 29 by rocking or shifting said dog, and this is effected by the shifter 28 through the medium of a spring-plunger 31 in its lower end, which plunger bears on the crown of the shifting-dog.

Now when the operating-arm is standing in its normal position, as in Fig. 3, the shifter 28 will bear on a stop-pin 32 in the casing, and the dog will stand in such a position that the arm may be pushed forward as the rear end of the dog will ride over the rack-teeth. Suppose the bartender has received seventy-five cents and wishes to ring it up on the apparatus. He inserts the displacing-pin 27 in the hole 23 below the numeral "75" in the series $x$ and pushes the operating-arm forward as far as it will go. The movement of the arm will be stopped when the shifter 28 shall have impinged upon the piston 25, protruded into its path by the pin 27. The effect of this will be to push the shifter over and cause the forward end of the dog 30 to engage the teeth of rack 29 and act as a stop or detent. The pawl 5 on arm 4 will now have passed over fifteen teeth on the ratchet-wheel 6, each of which may be said to represent five cents. He now draws back the operating-arm to its first position, and the pawl 5 turns the ratchet-wheel to the extent of fifteen teeth. When the arm reaches its normal position, the mechanism before described sounds the gong or bell. The insertion of pin 27 elevates or throws up the plate 24 bearing the numeral "75," and the movement of the arm back to its normal position rotates the cents-disk 10 until the numeral "75" thereon stands opposite a sight-aperture 14.

The purpose of the dog 30 is to compel the operator to make the full forward movement and backward movement called for. He must move the arm forward until the dog is shifted, and when it is shifted he can only move it backward, and he must move it backward until it is again shifted.

All of the plates 24 move up and down in a vertical plane and will fall by gravity after the pin 27 is withdrawn. This pin is allowed to remain in until the next operation.

It will be observed that the arm 3 may stand in any position with respect to the inner arm 4, as said arm 3 does not impinge on the pin 27. It will also be observed that the shifter 28 does not touch said pin 27, but strikes the piston coupled to the numeral-bearing plate. Hence any pin that will enter the hole may be used, provided it fits the hole snugly.

Having thus described my invention, I claim—

1. In a cash-counter, the combination, with the casing having a series of holes 23 and series of slits $y$ opening into same, as described, of the plates 24, pivotally mounted in said slits, the pistons 25, mounted in the respective holes, and the links 26, which connect the plates with their respective pistons, substantially as set forth.

2. In a cash-counter, the combination, with the rock-shaft 2 in the casing and the pawl-arm 4 thereon, of the said casing 1, having a series of vertically-arranged slits $y$ in its horizontal flat top and a horizontally-arranged series of holes 23 in its upright face, into which the respective slots open, the numeral-bearing plates 24, pivotally mounted in the said slits, and the pistons 25 in said holes, adapted to be protruded into the path of the pawl-arm when the said plates are thrown up, said series of holes being so spaced that they will be bisected by equally-spaced radii drawn from the axis of shaft 4, as and for the purposes set forth.

In witness whereof I have hereunto signed my name in the presence of two subscribing witnesses.

LOUIS T. WEISS.

Witnesses:
HENRY CONNETT,
J. D. CAPLINGER.